United States Patent [19]

Lee et al.

[11] Patent Number: 4,478,974

[45] Date of Patent: Oct. 23, 1984

[54] HETEROGENEOUS POLYMER LATEX OF RELATIVELY HARD AND RELATIVELY SOFT INTERPOLYMERS OF A MONOVINYLIDENE AROMATIC MONOMER AND AN ALIPHATIC CONJUGATED DIENE MONOMER

[75] Inventors: Do IK. Lee, Midland, Mich.; Traute Mundorf, Milan, Italy

[73] Assignee: The Dow Chemical Company, Midland, Mich.

[21] Appl. No.: 520,047

[22] Filed: Aug. 4, 1983

Related U.S. Application Data

[63] Continuation-in-part of Ser. No. 152,264, May 21, 1980, abandoned.

[51] Int. Cl.$^3$ ............................................. C08F 279/02
[52] U.S. Cl. ..................................... 524/533; 525/301; 525/303; 525/316; 525/902
[58] Field of Search ............... 525/301, 303, 316, 902; 524/533

[56] References Cited

U.S. PATENT DOCUMENTS

| | | | |
|---|---|---|---|
| 2,745,818 | 5/1956 | TeGrotenhuis | 260/29.6 |
| 3,917,749 | 11/1975 | Hess | 260/880 |
| 4,134,872 | 1/1979 | Lee | 427/391 |
| 4,156,669 | 5/1979 | Lee | 428/407 |
| 4,173,600 | 11/1979 | Kishida | 525/76 |
| 4,258,104 | 3/1981 | Lee | 428/511 |

*Primary Examiner*—Paul R. Michl
*Attorney, Agent, or Firm*—Jeffrey S. Boone

[57] ABSTRACT

Aqueous latexes of heterogeneous polymer particles comprising (1) a minor portion of a soft interpolymer domain having a glass transition temperature of less than 25° C. and comprising a monovinylidene aromatic monomer such as styrene and an open chain aliphatic conjugated diene such as 1,3-butadiene and (2) a major portion of a relatively hard interpolymer domain having a glass transition temperature greater than 25° C. and comprising a monovinylidene aromatic monomer such as styrene; an open chain aliphatic conjugated diene monomer such as 1,3-butadiene and a functional monomer such as acrylic acid are useful as binders for pigmented paper coating compositions. The coated papers of the invention exhibit an excellent combination of binding strength and stiffness.

17 Claims, No Drawings

HETEROGENEOUS POLYMER LATEX OF RELATIVELY HARD AND RELATIVELY SOFT INTERPOLYMERS OF A MONOVINYLIDENE AROMATIC MONOMER AND AN ALIPHATIC CONJUGATED DIENE MONOMER

CROSS-REFERENCE TO RELATED APPLICATION

This application is a continuation-in-part of application Ser. No. 152,264, filed May 21, 1980, now abandoned.

BACKGROUND OF THE INVENTION

This invention relates to stable aqueous latexes of interpolymers of a monovinylidene aromatic monomer and an open chain aliphatic conjugated diene and to the use of such latexes in paper coating compositions.

Stable aqueous dispersions of polymers, which are referred to in the art as latexes, are generally known to be useful, both alone and in various formulations, as coatings and impregnants for various types of substrates. A wide variety of latexes of differing homopolymeric and copolymeric composition (such as styrene-butadiene copolymers, acrylic homopolymers and copolymers, vinylidene chloride homopolymers and copolymers, etc.) have been developed having specific chemical and/or mechanical properties for particular end use applications. For example, aqueous interpolymer latexes resulting from the emulsion polymerization of monovinylidene aromatic monomers, such as styrene; diolefins, such as butadiene; and monoethylenically unsaturated carboxylic acids, such as acrylic acid; are known to be particularly useful as film-forming binders for pigments in paper coating applications. See, for example, U.S. Pat. Nos. 3,399,080 and 3,404,116. Such emulsion polymerizations optionally employ conventional seeding procedures for optimum control of the polymerization and to obtain maximum product uniformity (e.g., narrow particle size distribution). The resulting interpolymers are generally film forming at room temperatures (i.e., from about 20° to about 25° C.) and are sometimes referred to as "soft" paper coating binders. Pigmented paper coatings employing such prior art "soft" interpolymer latexes are generally characterized by excellent pigment binding, often expressed in terms of wet pick and dry pick test results. However, such coatings are also characterized by somewhat limited gloss development, ink receptivity and stiffness. Naturally, improvement of the stiffness, gloss, and ink receptivity in such coatings is an ever-present goal of the industry.

Attempts have been made in the prior art to provide improved gloss and ink receptivity as well as improved stiffness while retaining adequate binding and smoothness. Such attempts have included the use as binders of blends of soft (or elastomeric) latexes with hard (or plastomeric) latexes. See, for example, U.S. Pat. No. 3,281,267. In addition, the use of plastic pigments in conjunction with, or as a replacement for, conventionally employed mineral pigments has been suggested. While such approaches have provided a measure of improvement in gloss, attendant sacrifices in other desirable coating properties (e.g., binding strength, wet strength, etc.) have been encountered.

More recently, the use of "hard" or "stiff" latex binders, which themselves impart a measure of stiffness and gloss to the coated paper articles, has been suggested for attainment of high gloss, stiff paper coatings. Such coatings generally employ latex binders of what are known as hard polymers. Such hard polymers generally have minimum film-forming temperatures in excess of normal room temperatures (e.g., 100° F. or higher). Accordingly, film formation to achieve binding of the pigment particles to each other and to the paper substrate is accomplished for such coatings at elevated temperatures. Such temperatures are controlled to insure only limited (i.e., incomplete) deformation of the hard polymer particles in order to achieve both binding of the pigment particles and the desired coating gloss. See, for example, U.S. Pat. Nos. 3,583,881; 3,634,298 and 3,873,345. Unfortunately, however, such prior art processes for high gloss paper coating are deficient in that (a) the coatings are characterized by relatively low binding strength and (b) the properties of the resulting coated paper product (such as gloss, ink receptivity, stiffness, smoothness and pigment binding strength) are generally highly sensitive to even relatively small variations (e.g., 5° to 10° C.) in the temperature of the film-forming step (e.g., drying or hot calendering). While sophisticated processing equipment and control systems can be employed to minimize processing temperature variations, such systems are expensive and are generally incapable of completely eliminating such temperature variations and the corresponding variations in product quality.

In view of the foregoing deficiencies in the binders of the prior art paper coatings, it would be highly desirable to provide an improved stiff binder which essentially eliminates these deficiencies, particularly those related to gloss, ink receptivity, binding strength and desirable combinations thereof and especially which reduces the sensitivity of such properties to processing temperature variations.

SUMMARY OF THE INVENTION

In one aspect, the present invention is such an improved binder which comprises an aqueous polymer latex, the dispersed polymer particles of which are heterogeneous and individually comprise per 100 parts by weight of the polymer particle (1) from about 20 to about 45 parts by weight of a relatively soft interpolymer domain having a glass transition temperature of less than about 25° C. and comprising, in polymerized form and based upon the total weight of such soft interpolymer (a) from about 25 to about 65 weight percent of a monovinylidene aromatic monomer and (b) from about 35 to about 75 weight percent of an open chain aliphatic conjugated diene monomer; and (2) from about 55 to about 80 parts by weight of a relatively hard interpolymer domain having a glass transition temperature greater than 25° C., said hard interpolymer comprising, in polymerized form and based upon the total weight of such hard interpolymer (a) from about 70 to about 90 weight percent of a monovinylidene aromatic monomer, (b) from about 10 to about 30 weight percent of an open chain aliphatic conjugated diene monomer, and (c) from about 0.5 to about 11 weight percent of a functional compound selected from the class consisting of addition polymerizable carboxylic acids, hydroxyalkyl acrylates, and hydroxyalkyl methacrylates.

In another aspect, this invention is an improved aqueous paper coating dispersion (i.e., a coating color) comprising (a) a conventional paper coating pigment and (b)

the polymer latex of the invention as a binder component therein.

In still another aspect, this invention is an improved coated paper product comprising a sheet carrying a dried deposit of the aforementioned coating composition.

The polymer latexes of the invention have excellent mechanical and storage stability and are readily prepared from relatively inexpensive available monomeric materials. In addition, the use of such latexes as binders in the paper coating of the invention provide coated paper products having substantially improved pigment binding strength while still maintaining at least comparable stiffness relative to that obtained when using latexes of homogeneous polymer particles corresponding either to (a) the overall monomeric composition of the heterogeneous latexes of the instant invention or to (b) the monomeric make-up of the hard interpolymeric portion of the heterogeneous polymer latexes of the present invention.

DETAILED DESCRIPTION OF THE INVENTION

The polymer particles of the latex of the invention are broadly characterized as generally heterogeneous, having a minor portion thereof by weight being composed of a relatively soft interpolymer domain and having a major portion thereof by weight being composed of a relatively hard interpolymer domain.

As used herein, the term "domain" refers to discrete regions within the aforementioned heterogeneous polymer particle which are either the aforementioned relatively hard interpolymer or the aforementioned relatively soft interpolymer.

The distribution within a heterogeneous polymer particle of the soft interpolymer domain and the hard interpolymer domain can vary. For example, the heterogeneous polymer may have only two distinct regions, e.g., a soft interpolymer core circumscribed by a hard interpolymer shell or mutually exclusive hemispherical soft and hard regions. On the other hand, the heterogeneous particle may have multiple regions of one or both components. For example, a generally spherical continuous region of one polymer may have several discrete regions of the other polymer dispersed in, or residing on the surface of, the continuous region. Alternatively, the heterogeneous particle may have an essentially continuous web-like region of one polymer that has its interstices filled with the other polymer.

Preferably, the distribution within the heterogeneous polymer particle is such that the relatively soft interpolymer portion is in the form of a continuous matrix having discrete regions of the relatively hard interpolymer dispersed within such soft matrix and/or distributed on the surface thereof.

The size of the aforementioned heterogeneous polymer particles can vary. However, for optimum coating characteristics, it is generally desirable that such particles have an average diameter of from about 80 to about 300, preferably from about 120 to about 200 nanometers.

The polymer latexes of the present invention are advantageously prepared in a sequential or staged emulsion polymerization process in which a latex either of the aforementioned soft interpolymer or of the aforementioned hard interpolymer is initially prepared in a first stage emulsion polymerization and thereafter the remaining hard or soft interpolymeric portion is formed in a second stage emulsion polymerization in the presence of the soft or hard polymer latex resulting from such first stage polymerization.

Preferably, in the practice of this invention the aforementioned soft interpolymer is formed in the above-noted first polymerization stage and the aforementioned hard interpolymeric portion is thereafter formed in the above-noted second polymerization stage. Thus, in such preferred embodiment, the polymer latexes of the invention are prepared by emulsion polymerizing from about 55 to about 80, preferably from about 60 to about 80, and most preferably from about 70 to about 80, parts by weight (based upon 100 parts by weight of total heterogeneous polymer product) of a monomer charge comprising, based upon the total weight of such monomer charge, from about 70 to about 90 (preferably from about 75 to about 85) weight percent of a monovinylidene aromatic monomer, from about 10 to about 30 (preferably from about 15 to about 25) weight percent of an open chain aliphatic conjugated diene, and from about 0.5 to about 11 (preferably about 1 to about 10) weight percent of a functional compound selected from the group comprising addition polymerizable carboxylic acids, hydroxyalkyl acrylates, and hydroxypropyl methacrylates, in an aqueous medium comprising from about 20 to about 45, preferably from about 20 to about 40, most preferably from about 20 to about 30, parts by weight (based upon 100 parts by weight of heterogeneous polymer product) of dispersed particles of the hereinbefore mentioned soft monovinylidene aromatic-/open chain aliphatic conjugated diene interpolymer. [However, as has been hereinbefore noted, polymer latexes within the broad scope of the present invention can also be suitably prepared in the reverse order by forming the indicated amounts of the soft interpolymer via emulsion polymerization in the presence of the indicated amounts of dispersed particles of the noted hard interpolymer component hereof.] Accordingly, the amount of the hard interpolymer regions in 100 parts by weight of the heterogeneous polymer particles of the invention is from about 55 to about 80, preferably from about 60 to about 80, and most preferably from about 70 to about 80, parts by weight and the amount of the relatively soft interpolymer domain therein is correspondingly from about 20 to about 45, preferably from about 20 to about 40, and most preferably from about 20 to about 30, parts by weight per 100 parts by weight of the ultimately produced heterogeneous polymer particles.

By the term "monovinylidene aromatic monomer" it is intended to include those monomers wherein a radical of the formula:

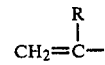

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho-, meta- and para-methylstyrene; ortho-, meta- and para-ethylstyrene; o,p-dimethylstyrene; o,p-diethylstyrene; isopropylstyrene; o-methyl-p-isopropylstyrene; p-chlorostyrene; p-bromostyrene; o,p-dichlorostyrene; o,p-dibromostyrene; vinylnapthalene; diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinylidene aromatic monomer.

By the term "open chain aliphatic conjugated diene" it is meant to include, typically, those containing from 4 to about 9 carbon atoms such as, for example, 1,3-butadiene; 2-methyl-1,3-butadiene; 2,3-dimethyl-1,3-butadiene; 1,3-pentadiene; 2-neopentyl-1,3-butadiene and other hydrocarbon analogs of 1,3-butadiene and, in addition, the substituted 1,3-butadienes, such as 2-chloro-1,3-butadiene; 2-cyano-1,3-butadiene, the substituted straight chain conjugated pentadienes, the straight chain and branched chain conjugated hexadienes, other straight and branched chain conjugated dienes having from 4 to about 9 carbon atoms, and comonomeric mixtures thereof. The 1,3-butadiene hydrocarbon monomers such as those mentioned hereinbefore provide interpolymers having particularly desirable properties and are therefore preferred. The cost, ready availability and the excellent properties of interpolymers produced therefrom makes 1,3-butadiene the most preferred open chain aliphatic conjugated diene.

In addition to the hereinbefore described monovinylidene aromatic and open chain aliphatic conjugated diene monomers, the relatively hard interpolymeric portion of the instant heterogeneous latex particles has interpolymerized therein from about 0.5 to about 11, preferably from about 1 to about 10, and more preferably from about 2 to about 5, weight percent of a functional compound selected from the group comprising addition polymerizable carboxylic acids, hydroxyalkyl acrylates, and hydroxyalkyl methacrylates.

The aforementioned addition polymerizable carboxylic acid monomers suitably employed in the practice of the invention can vary so long as such acids are copolymerizable with the other monomers of the monomer charge employed. Preferred are monoethylenically unsaturated carboxylic acids. Examples of such suitable acids include itaconic acid, acrylic acid, methacrylic acid, fumaric acid, maleic acid, vinyl benzoic acid and isopropenyl benzoic acid and preferred species thereof include acrylic acid, methacrylic acid, itaconic acid, fumaric acid and maleic acid. Naturally, comonomeric mixtures of the indicated monoethylenically unsaturated acids can be employed if desired. Moreover, such acids can be introduced to the polymerization as such or they can be formed in situ in an aqueous polymerization medium by introducing a hydrolyzable derivative of such acid (e.g., salts or the anhydride of the desired acid) into such aqueous medium.

The aforementioned hydroxyalkyl acrylates and hydroxyalkyl methacrylates preferably are those having from 2 to 4 carbon atoms in the ester moiety (alcohol residue). Suitable examples include 2-hydroxyethyl acrylate and 3-hydroxypropyl acrylate.

In addition to the aforementioned monomers, there can also optionally be employed in forming the relatively hard interpolymer portion of the instant heterogeneous polymer latexes a small amount (e.g., from about 1 to about 15, preferably from about 1 to about 10 weight percent of the hard interpolymerforming monomer charge) of other copolymerizable monomers. Suitable optional monomers include, for example, alkyl acrylates wherein the alkyl group contains from 1 to about 18 carbon atoms, such as methyl acrylate, ethyl acrylate, propyl acrylate, 2-ethylhexyl acrylate, etc.; alkyl methacrylates such as methyl methacrylate, ethyl methacrylate, propyl methacrylate, n-butyl methacrylate and similar alkyl methacrylates wherein the alkyl group contains from 1 to about 18 carbon atoms; acrylonitrile; methacrylontrile and similar monoethylenically unsaturated monomers.

The relatively soft interpolymer portion of the dispersed heterogeneous polymer particles of the present invention is also an interpolymer of the aforementioned monovinylidene aromatic and open chain aliphatic conjugated diene monomers. However, the relative proportion of such monomers employed in such soft interpolymer are selected such that the resulting soft interpolymer has a glass transition temperature of less than about 25° C. Accordingly, soft interpolymers suitably employed herein typically include those comprising, in polymerized form and in weight percent based on the weight of such soft interpolymer, from about 25 to about 65 (preferably from about 40 to about 60) weight percent of the hereinbefore described monovinylidene aromatic monomer and from about 35 to about 75 (preferably from about 40 to about 60) weight percent of the hereinbefore described open chain aliphatic conjugated diene monomers. Optionally, the aforementioned relatively soft interpolymer component employed herein can also contain (i.e., in addition to the aforementioned monovinylidene aromatic and open chain aliphatic conjugated diene monomers) a small proportion of other ethylenically unsaturated monomers which are copolymerizable therewith. Thus, for example, the soft interpolymeric components suitable for use herein can optionally further comprise up to about 20 weight percent (preferably from about 1 to about 15, and especially from about 1 to about 10, weight percent) of the aforementioned $C_1$ to about $C_{18}$ alkyl or $C_2$ to $C_4$ hydroxyalkyl esters of acrylic or methacrylic acid, the nitriles of such acids as well as the indicated acids themselves. Indeed, in a preferred embodiment of the instant invention, the soft interpolymer component hereof does further comprise from about 0.5 to about 11 (preferably from about 1 to about 10, and more preferably from about 2 to about 5) weight percent of one or more of the functional compounds which have been hereinbefore discussed in conjunction with the relatively hard interpolymer component of the present invention.

As has been noted, the average diameter of the dispersed heterogeneous polymer particles of the present invention is typically in range of from about 80 to about 300 (preferably from about 120 to about 200) nanometers (1 nanometer (nm) = $10^{-9}$ meter) and naturally the average diameter of the initial soft or hard latex prepared in the aforementioned first emulsion polymerization stage is somewhat less than the overall diameter desired for the ultimate dispersed heterogeneous polymer particles of the final latex to be prepared herein. Thus, for example, when the soft interpolymer portion (i.e., the minority component of the instant heterogeneous particle latexes) is formed in the first polymerization stage, the average diameter of the resulting soft interpolymer latex is typically from about 60 to about 77 percent of that desired for the ultimate heterogeneous particle latexes of the present invention. Alternatively, when the hard interpolymer portion (i.e., the majority component of the instant heterogeneous particle latexes) is formed in the first stage polymerization, the average diameter of the resulting hard interpolymer latex is typically from about 82 to about 93 percent of that desired for the ultimate heterogeneous particle latexes of the instant invention.

In the preparation of the heterogeneous polymer latexes of the present invention, conventional two stage emulsion polymerization techniques can be employed such as those exemplified in U.S. Pat. No. 2,962,465 and in U.S. Pat. No. 4,134,872 and the polymerization procedures in both polymerization stages can thus be accomplished by the generally known techniques for polymerizing ethylenically unsaturated monomers in aqueous emulsion.

Optionally, conventional seeding procedures can be employed in the aforementioned first polymerization stage to aid in controlling the polymerization and in achieving the desired particle size and particle size distribution. Typically, such seed, if used, is employed in amounts corresponding to from 0.1 to about 1 weight percent based upon the first stage monomer charge and ranges in size from about 10 to about 20 percent of the diameter of the polymer particles to be formed in such first stage polymerization.

In the preparation of the chosen first stage polymer latex, the comonomers (and the aforementioned optional seed) to be employed are typically dispersed, with agitation sufficient to emulsify the mixture, in an aqueous medium which may contain a known free radical polymerization catalyst and/or a known emulsifying agent (i.e., surfactant) as well as other ingredients coventionally employed in the art as emulsion polymerization aids.

Similarly, the second stage polymerization is conducted in much the same fashion with the exception
(a) that it is conducted in an aqueous medium comprising the latex resulting from the first stage polymerization and
(b) that it is conducted with the addition of no (or only small amounts of) additional emulsifier and no additional seed latex in order that the majority of the second stage interpolymerization occurs on, in or around the existing dispersed polymer particles resulting from the aforementioned first emulsion polymerization stage.

Suitable free radical polymerization catalysts for use in the preparation of the heterogeneous polymer latexes of the invention include those already known to promote emulsion polymerization. Among such catalysts are water-soluble oxidizing agents such as organic peroxides (e.g., t-butyl hydroperoxide, cumene hydroperoxide, etc.), inorganic oxidizing agents (e.g., hydrogen peroxide, potassium persulfate, sodium persulfate, ammonium persulfate, etc.) and catalysts which, like redox catalysts, are activated in the water phase, for example, by a water-soluble reducing agent.

Such catalysts are employed in an amount sufficient to cause polymerization (i.e., in a catalytic amount). As a general rule, an amount ranging from about 0.01 to about 5 weight percent based upon the total monomer to be polymerized in a given polymerization stage is sufficient. Alternatively, other free radical producing means, such as exposure to activating radiations, can be employed rather than heat and/or catalytic compounds to activate the polymerization.

Suitable emulsifying agents which can be employed in the aforementioned two stage polymerization to prepare the instant heterogeneous polymer latexes include anionic, and nonionic emulsifiers customarily used in emulsion polymerization. Usually at least one anionic emulsifier is included and one or more nonionic emulsifiers can also be present. Representative types of anionic emulsifiers are the alkyl aryl sulfonates, alkali metal alkyl sulfates, the sulfonated alkyl esters, the fatty acid soaps and the like. Specific examples of these well known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. Such emulsifying agents can be employed in varying amounts so long as adequate emulsification is achieved to provide particles of the desired particle size and particle size distribution. For example, when a seed latex is employed in the aqueous medium to be used as, for example, in the aforementioned first polymerization stage, suitable control of particle size and distribution can often be conveniently achieved without addition of an emulsifying agent to the aqueous medium. However, as a general rule, an amount ranging from about 0.01 to about 5 weight percent, based upon the total monomer to be polymerized, is advantageously employed.

Other ingredients (e.g., acids, salts, chain transfer agents, chelating agents, etc.) known in the art to be useful for various specific purposes in emulsion polymerization can also be employed in preparation of the heterogeneous polymer latexes of the present invention. For example, when the polymerizable constituents for such polymer latex include a monoethylenically unsaturated carboxylic acid comonomer, polymerization under acidic conditions (e.g., the aqueous media having a pH value of from about 2 to about 7 especially from about 2 to about 5) is preferred. In such instances, the aqueous medium can include acids and/or salts to provide the desired pH value and possibly a buffered system. On the other hand, when a monoethylenically unsaturated carboxylic acid monomer is not employed, the pH of the aqueous medium can conveniently range from about 2 to about 10.

The manner of combining the aforementioned ingredients in the above-noted individual polymerization stages can vary. For example, various known monomer feed methods (such as continuous monomer addition, incremental monomer addition or addition in a single charge of the entire amount of monomer to be employed in the individual polymerization stage) can be utilized. Similarly, the entire amount of the aqueous medium (or specific ingredients thereof) can be present in the polymerization vessel before introduction of the desired comonomer mixture. Alternatively, the aqueous medium (or a portion thereof) can be added (continuously or incrementally) during the course of the polymerization.

Polymerization is generally initiated by heating the emulsified monomer mixture (with continued agitation) to a temperature usually between about 50° and about 110° C., preferably between about 70° and about 100° C. Polymerization is continued by maintaining the emulsified mixture at the selected temperature until the desired conversion of monomer to polymer has been reached.

Following the above-described polymerization in the aforementioned individual polymerization stages, the resulting latex can optionally be filtered to remove any precoagulum and then stabilized to storage by the addition of a small amount of known stabilizer. Preferably, however, the filtering and stabilization steps are eliminated with respect to the intermediate latex of the first stage polymerization by proceeding directly to the polymerization of the monomer charge to be employed in the second polymerization stage.

It is sometimes preferable in the emulsion polymerization steps of the instant invention (especially in the emulsion polymerization of the above-described relative soft interpolymeric component hereof) to employ a conventional chain transfer agent such as bromoform, carbon tetrachloride, long chain mercaptans (e.g., lauryl mercaptan, dodecyl mercaptan, etc.), or other known chain transfer agents. Conventional amounts (e.g., from about 0.1 to about 5 weight percent based on the total monomer charge) of such chain transfer agents are typically employed in such preferred embodiments. In addition, since the monomer charges for formation of both the soft and hard polymer components hereof preferably include a monoethylenically unsaturated carboxylic acid, the aqueous emulsion polymerization mediums thereof are preferably acidic (i.e., having a pH value of from about 2 to about 7, especially from about 2 to about 5). Accordingly, the aqueous medium can contain acids and/or salts to provide the desired pH value and possibly a buffered system.

As has been noted, the manner of combining the ingredients for the heterogeneous interpolymer latexes of the invention can vary. However, in order to obtain maximum product uniformity, it is preferable that substantially all of the intermediate latex of the first polymerization stage is dispersed in the polymerization vessel before initiating polymerization of the second stage monomer charge.

Following completion of the overall two stage polymerization process, the solids content of the resulting aqueous heterogeneous polymer latex can be adjusted to the level desired by adding water thereto or by distilling water therefrom. Generally, such desired level of polymeric solids content is from about 20 to about 65, preferably from about 45 to about 60, weight percent on a total weight basis.

Suitable particle sizes can generally be achieved directly from the polymerization. However, screening of the resulting latex to remove particles outside the desired size range and to thus narrow the particle size distribution can be optionally employed.

For various applications it is sometimes desirable to have small amounts of certain known additives incorporated in the latex. Typical examples of such additives are surfactants, bacteriocides (e.g., formaldehyde), neutralants, antifoamers, etc. Such additives can be incorporated into the latexes of the invention in a conventional manner and at any convenient point in the preparation of such latexes.

The heterogeneous polymer latexes of the invention are particularly advantageous as relatively hard or stiff binders in the preparation of improved coating colors for use in paper coating applications wherein elevated temperatures are employed to cause deformation of such binder particles and to thereby induce binding as between the paper coating pigment employed and the paper substrate as well as between the paper coating pigment particles themselves.

The term "coating color" is often applied in the art to aqueous paper coating compositions comprising an adhesive (commonly called a "binder") and a pigment. In the "coating colors" of the invention, the adhesive and the pigment are mixed in such proportions that, for each 100 parts by weight of dry pigment, from about 5 to about 30 (preferably from about 10 to about 25) parts by weight, dry basis, of adhesive are present in the mixture. The latex disclosed herein can be the sole adhesive (or binder) employed in the coating colors of this invention or other adhesives known in the art (e.g., other latexes known to be useful as adhesives or natural binders such as casein, protein, starch, etc.) can be used in conjunction with the latex of the invention if desired. Generally, from about 20 to about 100 percent, preferably from about 50 to about 100 percent most preferably from about 70 to about 100 percent, by weight of the adhesive in a coating color of this invention is the heterogeneous polymer latex described herein, the percentages being on a dry solids basis.

The total solids content of the coating color of the invention (a) does not differ substantially from that in prior art paper coating colors, (b) depends largely upon the equipment being used and (c) usually ranges from about 30 percent to about 70 percent by weight based upon the total coating color weight.

Pigments which can be employed in the improved paper coating compositions of the invention include known mineral pigments, known plastic pigments and mixtures thereof.

Any mineral pigments suitable for use in conventional mineral pigmented paper coating compositions can be employed in the coating composition of the invention. Examples of suitable mineral pigments for use in the coating compositions of the invention thus include finely divided clays (especially of the kaolin type), calcium carbonate, titanium dioxide, satin white, etc. Other materials such as talc, blanc fixe, ochre, carbon black, aluminum powder or platelets, and other pigmentary or filler material can be employed in minor amounts in conjunction with the aforementioned mineral pigments.

Plastic pigments suitable for use in the aqueous paper coating composition of the invention include those known to be useful in plastic pigmented paper coatings, such as those described in U.S. Pat. No. 3,949,138. Such plastic pigments are generally characterized as plastic, polymeric particles which (a) have a number average particle diameter of from about 300 to about 800 nanometeres and (b) are not film-forming at temperatures and pressures selected to dry or finish the coated paper. By "nonfilm-forming" it is meant that the plastic particles do not coalesce to form a film at ambient temperature or at temperatures and pressures selected to dry or finish the coated article. Other plastic pigments suitable for use in the aqueous paper coating composition of the invention include those described in U.S. Pat. Nos. 3,293,144 and 3,988,522.

The coating colors of the invention can optionally contain other additives such as thickeners (e.g., alginic acid or carboxymethylcellulose) and curing agents (e.g., melamine formaldehyde resins, urea formaldehyde resins and glyoxal) to achieve specific coating properties. When thickeners and/or curing agents are employed, they generally constitute, individually, from about 1 to about 5 percent of the total binder weight on a dry basis.

The aforementioned components can be combined to form the coating colors of the invention in any convenient manner. As a general rule, however, it is convenient and preferred to disperse the pigment (or pigment mixture) and other powdery components in water and adjust the pH of the resulting dispersion to a value between about 6 and about 9 before mixing such dispersion with the latex of the invention. Tetrasodium pyrophosphate is often used as a dispersing aid, particularly where mineral pigments constitute all or a portion of the pigment or pigment mixture. In that case, additional pH adjustment is generally not required. However, (a)

if no other additives are present while forming the pigment dispersion or (b) if agents which are acidic or which require alkaline pH for effectiveness are used, such as sodium hexametaphosphate, a pH adjustment is generally made with alkalizing agents such as sodium hydroxide, potassium hydroxide, ammonium hydroxide and the like.

The coating color of the invention is conveniently applied to the paper by conventional means such as letter-press print roll coater, offset roll coater, size press, air knife or blade coater.

After application, the coating is dried by any convenient method. Generally, however, drying is accomplished by causing a current of air at a velocity of up to about 10,000 feet per minute to impinge upon the surface of the coated material. The temperature of the air may vary up to about 320° C. but the duration of contact is such that the coating is not heated to above about 100° C.

After drying, the coated paper product can be finished pursuant to processes conventionally employed in the art such as gloss calendering, supercalendering and the like and can be subsequently printed in any desired conventional fashion. However, in this regard, it should be noted that a particular advantage of the present invention is that the paper coatings thereof exhibit improved adhesion of the paper coating pigment to the paper substrate relative to comparable coatings employing conventional homogeneous hard or stiff paper coating adhesive latexes and, in addition, that a second advantage hereof is that the binding strength of such coatings also are generally substantially less sensitive to the fluctuations in processing temperatures which are often encountered in conventional drying and finishing operations.

The present invention is further illustrated, though not intended to be limited by, the following examples in which all parts and percentages are on a weight basis unless otherwise specified.

EXAMPLE 1

Latex and Paper Coating of a Hard
Styrene/Butadiene/Acrylic Acid Copolymer
Polymerized in the Presence of a Soft
Styrene/Butadiene/Acrylic Acid Copolymer A two stage latex is prepared having 20 parts by weight of a 63/35/2 weight ratio styrene/butadiene/acrylic acid comonomer charge emulsion polymerized in a first emulsion polymerization stage and 80 parts by weight of a 72/25/3 weight ratio styrene/butadiene/acrylic acid comonomer charge polymerized in a second stage emulsion polymerization conducted in the presence of the latex resulting from the first emulsion polymerization stage.

The first stage polymerization is externally seeded with a 0.025 micrometer average diameter 97:3 weight ratio styrene/acrylic acid copolymer latex in an amount corresponding to 0.2 part by weight (dry basis) per 100 parts by weight of the combined total monomer to be polymerized in both polymerization stages.

An initial aqueous medium is employed which contains (in parts by weight per 100 parts by weight of the total monomer) 69 parts of water, 0.1 part of sodium dodecyldiphenyl oxide disulfonate, 0.01 part of chelating agent (i.e., the pentasodium salt of diethylenetriamine pentaacetic acid) and the aforementioned external seed.

An additional aqueous stream containing (by weight per 100 parts by weight of total monomer in both stages) a total of 30 parts deionized water, 0.5 part of sodium dodecyldiphenyl oxide sulfonate, 0.2 part of sodium hydroxide and 0.5 part of sodium persulfate is added to the aforementioned initial aqueous medium continuously over the first 4.5 hours of the polymerization.

Both polymerization stages are conducted at 90° C. and continuous monomer addition is employed in each instance. The first stage monomer charge (including 1 part $CCl_4$ based upon 100 parts of the overall monomer charge) is added at a constant rate over a 0.8-hour period and a 0.5-hour cookdown (at 90° C.) is then provided before commencing addition of the second monomer charge. Following the first stage cookdown, the second stage monomer charge (having admixed therewith 4 parts by weight of $CCl_4$ per 100 parts by weight of the overall monomer charge) is added at a constant rate over a 3.2-hour period.

Following complete addition of the second stage monomer charge, a 1-hour cookdown is provided after which the latex is steam-stripped to remove residual monomers and volatile organic substances. The resulting latex contains 49 percent polymer solids on a total weight basis.

The latex is then compounded into a coating composition with Number 1 clay pigment and water in a ratio of 7 parts by weight latex solids per 100 parts by weight of clay to form an aqueous paper coating composition having about 60 weight percent total solids.

A coating of the resulting composition is applied, at about 15 pounds per 3,300 square feet ream (i.e., 0.01 kg/sq meter) to one surface of a general-purpose medium weight base stock using a No. 10 Meyer rod. The coating is then oven dried at 100° C., supercalendered at 1,200 pounds per linear inch (i.e., 214.5 kg/cm) and 150° F. (i.e., 65.6° C.) and the pigment binding strength of the resulting coated paper is determined by IGT Pick testing pursuant to TAPPI Standard T-499 using No. 3 ink.

In addition, a second coated paper sample is also prepared which is coated on both sides in the above-noted manner and the stiffness of such second sample is measured using a Clark Softness tester pursuant to TAPPI Standard T-451 m-60.

The stiffness and pigment binding strength results for the coated papers employing the heterogeneous polymer latex of this example are presented in Table I below.

EXAMPLE 2

Latex and Paper Coating of a Soft
Stryene/Butadiene-Acrylic Acid Copolymer
Polymerized in the Presence of a Hard
Styrene/Butadiene/Acrylic Acid Copolymer In this example, a latex is prepared having 80 parts by weight of a 74/25/1 weight ratio styrene/butadiene/acrylic acid comonomer charge polymerized in a first emulsion polymerization stage and 20 parts by weight of a 55/35/10 styrene/butadiene/acrylic acid comonomer charge polymerized in a second stage emulsion polymerization conducted in the presence of the latex resulting from the first emulsion polymerization stage.

In the staged emulsion polymerization of this example, the procedures of Example 1 are followed with the exception (a) that the majority component (i.e., the hard polymer) is prepared in the first polymerization stage and the minority component (i.e., the soft polymer) is prepared in the second polymerization stage and (b) that, naturally (i.e., keeping the respective hard and soft monomer charge feed rates the same as in Example 1), the duration of the first and second stage polymerization periods are reversed relative to those employed in Example 1.

Similarly, the paper coating and coated paper evaluation procedures of Example 1 are also employed for the heterogeneous polymer latex of this example and the results of such evaluations are summarized in Table I below.

EXAMPLE 3

Latex and Paper Coating of a Hard Styrene/Butadiene/Acrylic Acid/Fumaric Acid Copolymer Polymerized in the Presence of a Soft Styrene/Butadiene/Acrylic Acid/Fumaric Acid Copolymer Example 1 is repeated with the exception that (a) the first stage monomer charge comprises 19.8 parts by weight of an about 63/35/1 weight ratio of styrene/butadiene/acrylic acid monomer mixture; (b) the second stage comprises 79.2 parts by weight of an about 72/25/2 weight ratio styrene/butadiene/acrylic acid monomer mixture; and (c) 1 part by weight of fumaric acid monomer is charged to the polymerization in conjunction with initial aqueous medium.

The stiffness and pigment binding strength for coated paper employing the latex of this example are determined in accordance with the procedures of Example 1 and the results thereof are presented in Table I below.

Comparative Experiment

Latex and Paper Coating of a Single Stage Hard Styrene/Butadiene/Fumaric Acid/Acrylonitrile Copolymer For comparative purposes, a single stage (or homogeneous) 73/25/1/1 weight ratio styrene/butadiene/fumaric acid/acrylonitrile copolymer latex is prepared generally pursuant to the polymerization techniques of Example 1 above.

In addition, coated paper samples employing the resulting hard single stage latex are also prepared and evaluated pursuant to the methods of Example 1 above and the pigment binding strength and stiffness results of such evaluations are included in Table I below.

TABLE I

| Latex | Binding Strength | Stiffness[3] | Comments |
|---|---|---|---|
| Example 1 | 320[1] | 22.8 | Soft first and Hard second |
| Example 2 | 255[1] | 22.6 | Hard first and Soft second |
| Example 3 | 280[2] | 21.5 | Soft first and Hard second |
| Comparative Single Stage* | 180[2] | 21.2 | Homogeneous, Hard only |

*Not an example of the invention.
[1]In ft/min with No. 3 Ink.
[2]In ft/min with No. 4 Ink.
[3]In centimeters.

As can be seen from the results in Table I, the heterogeneous polymer latexes of Examples 1, 2 and 3 exhibit superior pigment binding strength and at least comparable stiffness when compared to the corresponding results for the comparative single stage hard homogeneous polymer latex.

While the present invention has been described with reference to specific illustrative examples, such examples are not to be understood as limiting the scope of the instantly claimed invention.

What is claimed is:

1. An aqueous synthetic polymer latex, the dispersed polymer particles of which are heterogeneous and individually comprise per 100 parts by weight of the polymer particle:
    (a) from about 20 to about 45 parts by weight of a relatively soft interpolymer domain having a glass transition temperature less than about 25° C. and comprising in polymerized form and based upon the total soft interpolymer:
        (1) from about 25 to about 65 weight percent of a monovinylidene aromatic monomer; and
        (2) from about 35 to about 75 weight percent of an open chain aliphatic conjugated diene monomer; and
    (b) from about 55 to about 80 parts by weight of a relatively hard interpolymeric domain having a glass transition temperature greater than 25° C. and comprising, in polymerized form and based upon the total hard interpolymer portion:
        (1) from about 70 to about 90 weight percent of a monovinylidene aromatic monomer;
        (2) from about 10 to about 30 weight percent of an open chain aliphatic conjugated diene monomer; and
        (3) from about 0.5 to about 11 weight percent of a functional compound selected from the class consisting of addition polymerizable carboxylic acids, hydroxyalkyl acrylates, and hydroxyalkyl methacrylates.

2. The polymer latex of claim 1 wherein the soft interpolymer domain constitutes from about 20 to about 40 parts by weight and wherein the relatively hard interpolymer domain constitutes from about 60 to about 80 parts by weight, both being based upon a total of 100 parts by weight of the dispersed heterogeneous polymer particles in such aqueous polymer latex.

3. The polymer latex of claim 1 wherein the dispersed heterogeneous polymer particles thereof individually comprise, on the basis of 100 parts by weight of such dispersed heterogeneous particles, an average of from about 20 to about 30 parts by weight of said soft interpolymer domain and from about 70 to about 80 parts by weight of said relatively hard interpolymer domain.

4. The polymer latex of claim 1 wherein the soft interpolymer domain further comprises, in polymerized form and based upon the total weight of such domain, from about 0.5 to about 11 weight percent of a functional compound selected from the class consisting of addition polymerizable carboxylic acids, hydroxyalkyl acrylates, and hydroxyalkyl methacrylates.

5. The polymer latex of claim 1 wherein the functional compound is present at from about 1 to about 10 weight percent.

6. The polymer latex of claim 4 wherein the functional compound in both the hard and soft polymer domains is present at about 1 to about 10 weight percent.

7. The polymer latex of claim 1 wherein the functional compound is a monoethylenically unsaturated carboxylic acid.

8. The polymer latex of claim 7 wherein the functional compound is acrylic acid, methacrylic acid, itaconic acid, fumaric acid, or maleic acid.

9. The polymer latex of claim 1 wherein the functional compound is a hydroxy $C_2$ to $C_4$ alkyl acrylate or a hydroxy $C_2$ to $C_4$ alkyl methacrylate.

10. The polymer latex of claim 9 wherein the functional compound is 2-hydroxyethyl acrylate or 3-hydroxypropyl acrylate.

11. The polymer latex of claim 1 wherein the monovinylidene aromatic monomer employed is styrene and wherein the open chain aliphatic conjugated diene monomer employed is 1,3-butadiene.

12. The polymer latex of claim 1 wherein the dispersed polymer particles thereof constitute from about 45 to about 60 weight percent of the total weight of such aqueous polymer latex.

13. The polymer latex of claim 1, wherein the dispersed polymer particles thereof have an average diameter of from about 80 to about 300 nanometers on a number average basis.

14. The aqueous polymer latex of claim 1 wherein the soft interpolymer portion of the dispersed polymer particles is in the form of a continuous soft interpolymer matrix and wherein the hard interpolymer portion thereof is dispersed within and/or distributed on the surface of such soft interpolymer matrix.

15. The aqueous polymer latex of claim 1 in which the soft interpolymer domain is prepared by polymerizing the monomer charge therefor in a first emulsion polymerization stage and wherein the hard interpolymer portion thereof is prepared by emulsion polymerizing its corresponding monomer charge in a second emulsion polymerization stage in an aqueous medium comprising the dispersed soft interpolymer particles resulting from said first stage emulsion polymerization.

16. A paper coating composition comprising,
 (i) a pigment; and
 (ii) from about 5 to about 30 dry parts by weight per 100 dry parts by weight of pigment of an aqueous synthetic polymer latex, the dispersed polymer particles of which are heterogeneous and individually comprise per 100 parts by weight of the polymer particles:
   (a) from about 20 to about 45 parts by weight of a relatively soft interpolymer domain having a glass transition temperature less than about 25° C. and comprising in polymerized form and based upon the total soft interpolymer:
    (1) from about 25 to about 65 weight percent of a monovinylidene aromatic monomer; and
    (2) from about 35 to about 75 weight percent of an open chain aliphatic conjugated diene monomer; and
   (b) from about 55 to about 80 parts by weight of a relatively hard interpolymeric domain having a glass transition temperature greater than 25° C. and comprising, in polymerized form and based upon the total hard interpolymer portion:
    (1) from about 70 to about 90 weight percent of a monovinylidene aromatic monomer;
    (2) from about 10 to about 30 weight percent of an open chain aliphatic conjugated diene monomer.

17. A coated paper comprising a paper having a dried coating of the composition of claim 16 on at least one surface.

* * * * *